US011256333B2

(12) United States Patent
Doan et al.

(10) Patent No.: US 11,256,333 B2
(45) Date of Patent: Feb. 22, 2022

(54) CLOSING, STARTING, AND RESTARTING APPLICATIONS

(71) Applicant: Microsoft Technology Licensing, LLC, Redmond, WA (US)

(72) Inventors: Christopher Doan, Issaquah, WA (US); Chaitanya Sareen, Seattle, WA (US); Matthew Worley, Bellevue, WA (US); Michael Krause, Woodinville, WA (US); Miron Vranjes, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 436 days.

(21) Appl. No.: 15/626,115

(22) Filed: Jun. 17, 2017

(65) Prior Publication Data

US 2017/0329415 A1 Nov. 16, 2017

Related U.S. Application Data

(63) Continuation of application No. 13/853,964, filed on Mar. 29, 2013, now Pat. No. 9,715,282.

(51) Int. Cl.
*G06F 3/01* (2006.01)
*G06F 3/0488* (2013.01)
*G06F 3/04883* (2022.01)

(52) U.S. Cl.
CPC .......... *G06F 3/017* (2013.01); *G06F 3/04883* (2013.01)

(58) Field of Classification Search
CPC combination set(s) only.
See application file for complete search history.

(56) References Cited

U.S. PATENT DOCUMENTS 5,317,687 A 5/1994 Torres
5,615,401 A 3/1997 Harscoet et al.
(Continued)

FOREIGN PATENT DOCUMENTS

EP 2187300 A1 5/2010
WO 2007089766 A2 8/2007

OTHER PUBLICATIONS

M. Wu et al., "Gesture registration, relaxation, and reuse for multi-point direct-touch surfaces," First IEEE International Workshop on Horizontal Interactive Human-Computer Systems (Tabletop '06), Adelaide, SA, Australia, 2006, pp. 8 pp.-, doi: 10.1109/TA (Year: 2006).*

(Continued)

*Primary Examiner* — Asher D Kells

(57) ABSTRACT

Described herein are embodiments that relate to implementation of multi-stage gestures, using multi-stage gestures to control applications, and allowing, under certain conditions, invocation of an open operation (which would normally only open an application or bring an application to the fore) to cause a target application to terminate before being newly opened. A multi-stage gesture may be used to invoke different functions at respective gesture stages of a same input stroke. The functions may be different forms of application "closing", such as backgrounding or suspending an application, terminating an application, and restarting an application. The restarting (including termination) of an application when the application is opened may be termed a "smart-restart", which may involve interpreting from specific user activity that a user intends to restart an application.

20 Claims, 10 Drawing Sheets

(56) References Cited

U.S. PATENT DOCUMENTS

| | | | | |
|---|---|---|---|---|
| 5,825,352 | A * | 10/1998 | Bisset | G06F 3/04186 345/173 |
| 6,064,812 | A | 5/2000 | Parthasarathy et al. | |
| 6,064,816 | A | 5/2000 | Parthasarathy et al. | |
| 6,342,894 | B1 * | 1/2002 | Nojiri | G09G 5/222 345/473 |
| 6,459,442 | B1 | 10/2002 | Edwards et al. | |
| 6,564,198 | B1 | 5/2003 | Narayan et al. | |
| 7,158,123 | B2 * | 1/2007 | Myers | G06F 3/0421 345/173 |
| 7,308,591 | B2 | 12/2007 | Dubinsky | |
| 7,453,439 | B1 * | 11/2008 | Kushler | G06F 3/0237 345/168 |
| 7,668,924 | B1 | 2/2010 | Young et al. | |
| 7,720,672 | B1 | 5/2010 | Buswell et al. | |
| 7,752,555 | B2 | 7/2010 | Sutanto et al. | |
| 7,761,814 | B2 * | 7/2010 | Rimas-Ribikauskas | G06F 3/017 715/863 |
| 7,834,861 | B2 | 11/2010 | Lee | |
| 7,840,912 | B2 * | 11/2010 | Elias | G06F 3/04883 715/863 |
| 7,870,496 | B1 | 1/2011 | Sherwani | |
| 7,956,847 | B2 * | 6/2011 | Christie | G06F 3/0486 345/173 |
| 8,161,415 | B2 | 4/2012 | Borgaonkar et al. | |
| 8,245,156 | B2 * | 8/2012 | Mouilleseaux | G06F 3/0482 715/834 |
| 8,261,213 | B2 | 9/2012 | Hinckley et al. | |
| 8,373,673 | B2 | 2/2013 | Shiplacoff et al. | |
| 8,390,577 | B2 | 3/2013 | Lemort et al. | |
| 8,413,075 | B2 * | 4/2013 | Ording | G06F 9/453 715/863 |
| 8,418,084 | B1 * | 4/2013 | Tischer | G06F 3/0488 715/863 |
| 8,473,949 | B2 | 6/2013 | Horvitz et al. | |
| 8,542,237 | B2 * | 9/2013 | Pahud | G06F 17/214 345/473 |
| 8,627,233 | B2 * | 1/2014 | Cragun | G06F 3/04812 715/834 |
| 8,638,939 | B1 * | 1/2014 | Casey | G06F 21/36 380/277 |
| 8,766,928 | B2 * | 7/2014 | Weeldreyer | G06F 3/0481 345/173 |
| 8,769,438 | B2 * | 7/2014 | Mangum | G06F 3/0488 715/853 |
| 8,806,369 | B2 | 8/2014 | Khoe et al. | |
| 8,810,509 | B2 | 8/2014 | Benko et al. | |
| 8,849,846 | B1 * | 9/2014 | Wang | G06F 16/23 707/766 |
| 8,935,631 | B2 * | 1/2015 | Leonard | G06F 3/04842 715/788 |
| 9,015,641 | B2 * | 4/2015 | Bocking | G06F 3/017 715/863 |
| 9,052,925 | B2 | 6/2015 | Chaudhri | |
| 9,111,076 | B2 * | 8/2015 | Park | G06F 3/0412 |
| 9,134,798 | B2 * | 9/2015 | Morris | H04L 67/42 |
| 9,164,654 | B2 * | 10/2015 | Goertz | G06F 3/0488 |
| 9,261,979 | B2 * | 2/2016 | Shamaie | G06F 3/0346 |
| 9,305,229 | B2 * | 4/2016 | DeLean | G06K 9/20 |
| 9,329,768 | B2 * | 5/2016 | Matthews | G06F 3/0488 |
| 9,335,913 | B2 | 5/2016 | Stephenson et al. | |
| 9,367,205 | B2 * | 6/2016 | Hinckley | G06F 3/04817 |
| 9,377,859 | B2 * | 6/2016 | Clarkson | G06F 3/017 |
| 9,448,712 | B2 * | 9/2016 | Platzer | G06F 3/04883 |
| 9,477,382 | B2 * | 10/2016 | Hicks | G06F 3/0485 |
| 9,715,282 | B2 * | 7/2017 | Doan | G06F 3/04883 |
| 9,891,811 | B2 * | 2/2018 | Federighi | G06F 3/0488 |
| 10,191,555 | B2 * | 1/2019 | Fujimaki | G02B 27/0172 |
| 2001/0022861 | A1 * | 9/2001 | Hiramatsu | G06F 3/0425 382/291 |
| 2001/0029521 | A1 | 10/2001 | Matsuda et al. | |
| 2002/0073207 | A1 | 6/2002 | Widger et al. | |
| 2002/0191028 | A1 | 12/2002 | Senechalle et al. | |
| 2003/0128244 | A1 * | 7/2003 | Iga | G06F 3/0488 715/863 |
| 2004/0141008 | A1 * | 7/2004 | Jarczyk | G06F 3/0486 715/781 |
| 2004/0193413 | A1 * | 9/2004 | Wilson | G06F 3/017 704/243 |
| 2004/0193699 | A1 | 9/2004 | Heymann et al. | |
| 2004/0212617 | A1 * | 10/2004 | Fitzmaurice | G06F 3/0481 345/440 |
| 2005/0149879 | A1 | 7/2005 | Jobs et al. | |
| 2005/0172162 | A1 | 8/2005 | Takahashi et al. | |
| 2005/0246726 | A1 | 11/2005 | Labrou et al. | |
| 2005/0278280 | A1 | 12/2005 | Semerdzhiev et al. | |
| 2006/0010400 | A1 * | 1/2006 | Dehlin | G06F 3/0421 715/856 |
| 2006/0022955 | A1 * | 2/2006 | Kennedy | G06F 3/04883 345/173 |
| 2006/0026521 | A1 | 2/2006 | Hotelling et al. | |
| 2006/0085767 | A1 * | 4/2006 | Hinckley | G06F 3/04842 715/863 |
| 2006/0107229 | A1 | 5/2006 | Matthews et al. | |
| 2007/0033590 | A1 | 2/2007 | Masuouka et al. | |
| 2007/0168890 | A1 * | 7/2007 | Zhao | G06F 3/04883 715/863 |
| 2008/0036743 | A1 * | 2/2008 | Westerman | G06F 3/038 345/173 |
| 2008/0046425 | A1 * | 2/2008 | Perski | G06F 3/04883 |
| 2008/0165140 | A1 | 7/2008 | Christie et al. | |
| 2008/0168379 | A1 | 7/2008 | Forstall et al. | |
| 2008/0168384 | A1 | 7/2008 | Platzer et al. | |
| 2008/0244589 | A1 | 10/2008 | Darnell et al. | |
| 2008/0266083 | A1 | 10/2008 | Midholt et al. | |
| 2009/0064155 | A1 | 3/2009 | Giuli et al. | |
| 2009/0125796 | A1 | 5/2009 | Day et al. | |
| 2009/0198359 | A1 * | 8/2009 | Chaudhri | G11B 27/34 700/94 |
| 2009/0213083 | A1 * | 8/2009 | Dicker | G06F 3/038 345/173 |
| 2009/0239587 | A1 * | 9/2009 | Negron | H04M 1/72533 455/566 |
| 2009/0278806 | A1 | 11/2009 | Duarte et al. | |
| 2009/0278812 | A1 * | 11/2009 | Yasutake | G06F 3/04815 345/173 |
| 2009/0289916 | A1 * | 11/2009 | Dai | G06F 21/36 345/173 |
| 2009/0307623 | A1 * | 12/2009 | Agarawala | G06F 3/04815 715/765 |
| 2009/0327964 | A1 * | 12/2009 | Mouilleseaux | G06F 3/0482 715/834 |
| 2010/0011106 | A1 | 1/2010 | Ohashi | |
| 2010/0020025 | A1 | 1/2010 | Lemort et al. | |
| 2010/0045705 | A1 * | 2/2010 | Vertegaal | A47G 19/2227 345/661 |
| 2010/0091677 | A1 | 4/2010 | Griff et al. | |
| 2010/0138834 | A1 | 6/2010 | Agarwal et al. | |
| 2010/0164909 | A1 | 7/2010 | Momono | |
| 2010/0185949 | A1 * | 7/2010 | Jaeger | G06F 3/0481 715/730 |
| 2010/0185989 | A1 * | 7/2010 | Shiplacoff | G06F 3/0416 715/856 |
| 2010/0194694 | A1 * | 8/2010 | Kraft | G06F 3/04883 345/173 |
| 2010/0202656 | A1 * | 8/2010 | Ramakrishnan | G06K 9/6278 382/103 |
| 2010/0205563 | A1 | 8/2010 | Haapsaari et al. | |
| 2010/0231537 | A1 * | 9/2010 | Pisula | G06F 3/04855 345/173 |
| 2010/0245131 | A1 | 9/2010 | Graumann | |
| 2010/0245246 | A1 * | 9/2010 | Rosenfeld | G06F 3/0383 345/163 |
| 2010/0295781 | A1 * | 11/2010 | Alameh | G06F 3/017 345/158 |
| 2011/0032566 | A1 | 2/2011 | Sato | |
| 2011/0074719 | A1 * | 3/2011 | Yeh | G06F 3/04883 345/173 |
| 2011/0078560 | A1 | 3/2011 | Weeldreyer et al. | |

(56) References Cited

U.S. PATENT DOCUMENTS

2011/0087982 A1 4/2011 McCann et al.
2011/0087989 A1 4/2011 McCann et al.
2011/0115702 A1 5/2011 Seaberg
2011/0126094 A1 5/2011 Horodezky et al.
2011/0154267 A1* 6/2011 Nurmi ................. G06F 3/04883 715/863
2011/0167369 A1 7/2011 van Os
2011/0167382 A1 7/2011 van Os
2011/0169753 A1* 7/2011 Shimamura ........... G06F 3/0486 345/173
2011/0179386 A1 7/2011 Shaffer et al.
2011/0193785 A1* 8/2011 Russell ............... G06F 3/04883 345/173
2011/0209088 A1* 8/2011 Hinckley ............. G06F 3/0488 715/810
2011/0221974 A1* 9/2011 Stern ....................... G06F 3/017 348/734
2011/0258582 A1* 10/2011 Bang ................... G06F 3/04886 715/811
2011/0260962 A1* 10/2011 Benko ................... G06F 3/0482 345/156
2011/0307778 A1 12/2011 Tsai et al.
2012/0060163 A1 3/2012 Khan et al.
2012/0062489 A1* 3/2012 Andersson .......... G06F 3/04883 345/173
2012/0068917 A1 3/2012 Huang et al.
2012/0069050 A1 3/2012 Park et al.
2012/0078388 A1 3/2012 Collins et al.
2012/0081270 A1 4/2012 Gimpl et al.
2012/0088477 A1 4/2012 Cassidy
2012/0096406 A1 4/2012 Chae et al.
2012/0110496 A1 5/2012 Lee et al.
2012/0154295 A1 6/2012 Hinckley et al.
2012/0174033 A1 7/2012 Joo
2012/0174043 A1* 7/2012 Queru .................... B60K 37/06 715/863
2012/0182226 A1 7/2012 Tuli
2012/0188175 A1 7/2012 Lu et al.
2012/0197959 A1 8/2012 Oliver et al.
2012/0216146 A1 8/2012 Korkonen
2012/0229398 A1* 9/2012 Zaliva ................... G06F 40/205 345/173
2012/0235938 A1* 9/2012 Laubach ................. G06F 3/041 345/173
2012/0254804 A1 10/2012 Sheha et al.
2012/0262386 A1 10/2012 Kwon et al.
2012/0278747 A1 11/2012 Abraham et al.
2012/0284012 A1 11/2012 Rodriguez et al.
2012/0299843 A1* 11/2012 Kim .................... G06F 3/04883 345/173
2012/0306786 A1* 12/2012 Bang ................... G06F 3/04886 345/173
2013/0002585 A1* 1/2013 Jee ........................ G06F 3/0483 345/173
2013/0057587 A1* 3/2013 Leonard .................. G06F 9/451 345/660
2013/0082965 A1* 4/2013 Wada .................. G06F 3/04883 345/173
2013/0114902 A1* 5/2013 Sukthankar ...... H04N 21/23418 382/190
2013/0117105 A1* 5/2013 Dyor .................. G06Q 30/0251 705/14.52
2013/0117780 A1* 5/2013 Sukthankar ........ G06K 9/00718 725/32
2013/0120254 A1* 5/2013 Mun ....................... G06F 3/017 345/158
2013/0124550 A1 5/2013 Oel et al.
2013/0139226 A1* 5/2013 Welsch ................... G06F 21/30 726/4
2013/0201113 A1 8/2013 Hinckley et al.
2013/0227464 A1* 8/2013 Jin ........................ G06F 3/0485 715/784
2013/0263042 A1 10/2013 Buening
2013/0285925 A1* 10/2013 Stokes .............. H04M 1/72469 345/173
2013/0290884 A1* 10/2013 Sotoike ................... A63F 13/42 715/765
2013/0326407 A1* 12/2013 van Os .................. G09B 29/10 715/810
2013/0328747 A1* 12/2013 Yoneda ................. G06F 3/1454 345/3.1
2014/0022190 A1* 1/2014 Tokutake .............. G06F 3/0488 345/173
2014/0040769 A1* 2/2014 Lazaridis ............ G06F 3/04883 715/752
2014/0071063 A1* 3/2014 Kuscher .............. G06F 3/04883 345/173
2014/0075388 A1* 3/2014 Kuscher .............. G06F 3/04886 715/834
2014/0080550 A1* 3/2014 Ino .................... H04W 52/0254 455/574
2014/0137029 A1* 5/2014 Stephenson ........... G06F 3/0486 715/784
2014/0164966 A1* 6/2014 Kim .................... G06F 3/04886 715/769
2014/0232648 A1* 8/2014 Park ...................... G06F 3/0483 345/156
2014/0267089 A1* 9/2014 Smith ................. G06F 3/04847 345/173
2014/0298672 A1* 10/2014 Straker ................ G06F 3/0416 34/175
2015/0113455 A1* 4/2015 Kang .................. G06F 3/04883 715/765
2015/0134572 A1* 5/2015 Forlines .................. G06F 3/041 706/11
2015/0309689 A1* 10/2015 Jin ...................... G06F 3/04883 715/765
2016/0070460 A1* 3/2016 Gradert ............... G06F 3/04883 715/771
2016/0188112 A1* 6/2016 Forlines ................... G06N 5/04 345/173
2016/0216853 A1* 7/2016 Lee ....................... G06F 3/0488
2016/0321841 A1* 11/2016 Christen ............... G06T 19/006
2017/0199660 A1* 7/2017 Guiavarc'H ....... G06K 9/00429
2017/0242580 A1* 8/2017 Gdala ..................... G06F 3/167
2018/0335936 A1* 11/2018 Missig ................ G06F 3/04817

OTHER PUBLICATIONS

G. Raffa, Jinwon Lee, L. Nachman and Junehwa Song, "Don't slow me down: Bringing energy efficiency to continuous gesture recognition," International Symposium on Wearable Computers (ISWC) 2010, Seoul, 2010, pp. 1-8, doi: 10.1109/ISWC.2010.5665872. (Year: 2010).*

"How to Close or Terminate Apps Completely in Multitasking iPhone", Retrieved From <<https://www.mydigitallife.net/how-to-close-or-terminate-apps-completely-in-multitasking-iphone/>>, Dec. 7, 2010, 4 Pages.

"Use Swipe Up or Down Gesture to Close Running Applications on Iphone: Swipeaway Cydia Tweak", Retrieved From <<http://www.badritek.com/2012/10/swipeaway-cydia-tweak-iphone-closes-applications-by-swipe.html>>, Oct. 23, 2012, 3 Pages.

"WinRT: App Activation, Resume and Suspend", Retrieved From <<http://thebillwagner.com/Blog/Item/2012-04-11-WinRTAppActivationResumeandSuspend>>, Feb. 18, 2013, 1 Page.

Mazo, Gary, "How to Switch Applications and Multitask on the Galaxy S3", Retrieved from <<http://www.androidcentral.com/how-switch-applications-and-multitask-samsung-galaxy-s3>>, Jul. 17, 2012, 7 Pages.

Michaluk, Kevin, "Using the Application Switcher and Closing Apps When Finished to Maximize your BlackBerry Efficiency", Retrieved from <<http://www.ecranmobile.fr/Using-the-Application-Switcher-and-Closing-Apps-When-Finished-to-Maximize-Your-BlackBerry-Efficiency_a5310.html>>, Aug. 17, 2009, 15 Pages.

Spradlin, Liam, "Switcher Provides an Incredible Gesture-based App Switching Tool", Retrieved From<<http://www.androidpolice.

(56) References Cited

OTHER PUBLICATIONS com/2012/07/09/switcher-proof-of-concept-hits-the-play-store-providing-an-incredible-gesture-based-app-switching-tool/>>, Jul. 9, 2012, 7 Pages.
"International Search Report and Written Opinion Issued in PCT Application No. PCT/US2013/059561", dated Mar. 12, 2014, 13 Pages.
"Non-Final Office Action Issued in U.S. Appl. No. 13/853,964", dated Jun. 19, 2015, 22 Pages.
"Final Office Action Issued in U.S. Appl. No. 13/853,964", dated Dec. 18, 2015, 21 Pages.
"Non-Final Office Action Issued in U.S. Appl. No. 13/853,964", dated Sep. 1, 2016, 27 Pages.
"Notice of Allowance Issued in U.S. Appl. No. 13/853,964", dated Apr. 12, 2017, 17 Pages.

* cited by examiner

| | ACTION | ON SCREEN? | IN TASK SWITCHER? | PROCESS RUNNING? | GESTURE STAGE |
|---|---|---|---|---|---|
| 200 | *close* | no | no | yes (or suspend) | stage1 |
| 202 | *terminate* | no | no | no | stage2 |
| 204 | *restart* | yes | yes | yes | stage3 |

FIG. 5

CLOSING, STARTING, AND RESTARTING APPLICATIONS

RELATED APPLICATION

This application is a continuation patent application of application with Ser. No. 13/853,964, filed Mar. 29, 2013, entitled "CLOSING, STARTING, AND RESTARTING APPLICATIONS", which is now allowed. The aforementioned application(s) are hereby incorporated herein by reference.

BACKGROUND

Recently, human actuated gestures have been increasingly used to control computing devices. Various devices may be used for inputting gestures, for example mice, touch-sensitive surfaces, motion detectors using camera signals, and pressure-sensitive input surfaces, to name a few examples. Generally, there are now many means for allowing a user to provide continuous (rapidly sampled) discrete two or three dimensional input strokes (e.g., sets of connected location points or paths interpolated therefrom).

To make use of these input means, graphical user interfaces (GUIs) have been implemented to recognize gestures and invoke specific actions for specific recognized gestures. Typically, gesture recognition might include collating input points sensed at a high sample rate, determining which input points are associated with each other, and analyzing traits or features of a set of associated input points to recognize a gesture. While any type of software or program can implement gestures, gesturing is often used in conjunction with graphical desktops, graphical user shells, window managers, and the like (referred to collectively as GUIs).

GUIs are often provided to allow a user to manage and execute applications. For example, a GUI environment may have user-activatable operations or instructions to allow direct manipulation of graphical objects representing windows, processes, or applications, to open specified applications, to pause or terminate specified applications, to toggle between applications, to manipulate graphical elements of applications such as windows, to provide standard dialogs, and so forth. In other words, in a GUI environment, a user may use gestures or other means to physically manipulate digital objects in ways related to semantic meaning attached to such objects (such as discarding and closing). Previously, such operations, if gesture controlled at all, would each have their own respective discrete gestures. For example, a simple gesture such as a downward stroke has been used to invoke a close operation to close a target application, which might be a currently focused or active application.

Such a close gesture has been used to terminate an application, which might destroy an executing instance of the application, kill the application's process, etc. Thus, the next time a user requests the terminated application a full boot sequence or launch of the application is usually needed, which may result in a significant delay between the time when the application is requested and the time when the application becomes available for user interaction. Additionally, as the instant inventors alone have recognized, there is no efficient gesture-based way for a user to specify different levels of application "closing", for instance, suspending, terminating, and restarting an application. As only the inventors have observed, because gestures are intended to represent physical manipulation of a digital object representing an application, there has been no ability to map gestures to a sufficient number of different actions to simultaneously support manipulation of the numerous possible underlying states of an application.

Discussed below are ways to implement multi-stage gestures and ways to use those gestures to issue various commands for controlling applications.

SUMMARY

The following summary is included only to introduce some concepts discussed in the Detailed Description below. This summary is not comprehensive and is not intended to delineate the scope of the claimed subject matter, which is set forth by the claims presented at the end.

Described herein are embodiments that relate to implementation of multi-stage gestures, using multi-stage gestures to control applications, and allowing, under certain conditions, invocation of an open operation (which would normally only open an application or bring an application to the fore) to cause a target application to terminate before being newly opened. A multi-stage gesture may be used to invoke different functions at respective gesture stages of a same input stroke. The functions may be different forms of application "closing", such as backgrounding or suspending an application, terminating an application, and restarting an application. The restarting (including termination) of an application when the application is opened may be termed a "smart-restart", which may involve interpreting from specific user activity that a user intends to restart an application.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

FIG. 5 shows attributes of example application management functions.

DETAILED DESCRIPTION

Embodiments discussed below relate to implementation of multi-stage gestures, using multi-stage gestures to control applications, and allowing, under certain conditions, invocation of an open operation (which would normally only open an application or bring an application to the fore) to cause a target application to terminate before being newly opened.

Figure 1:
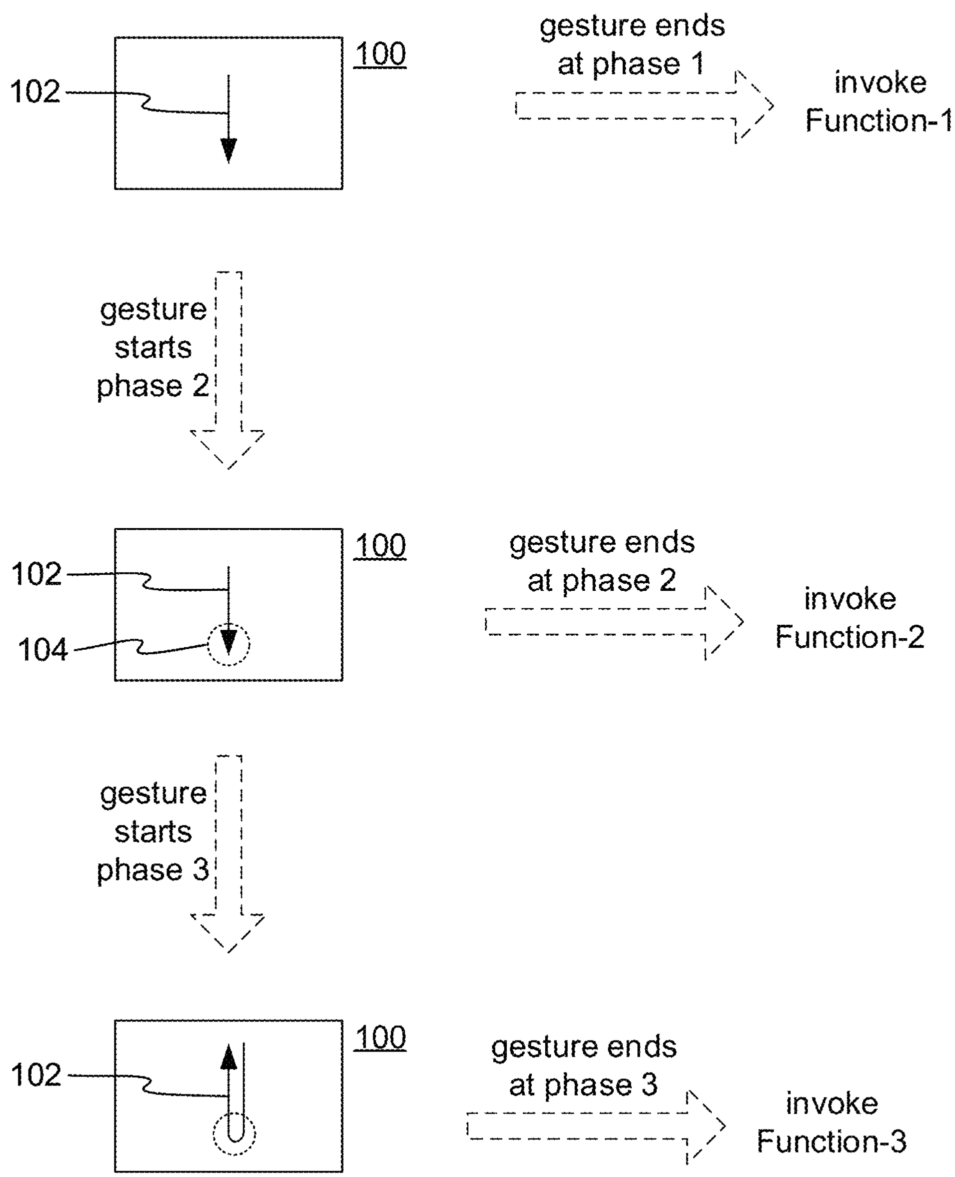
FIG. 1 shows an example of a multi-stage gesture for invoking functions or actions on a host computing device.
Figure 10:
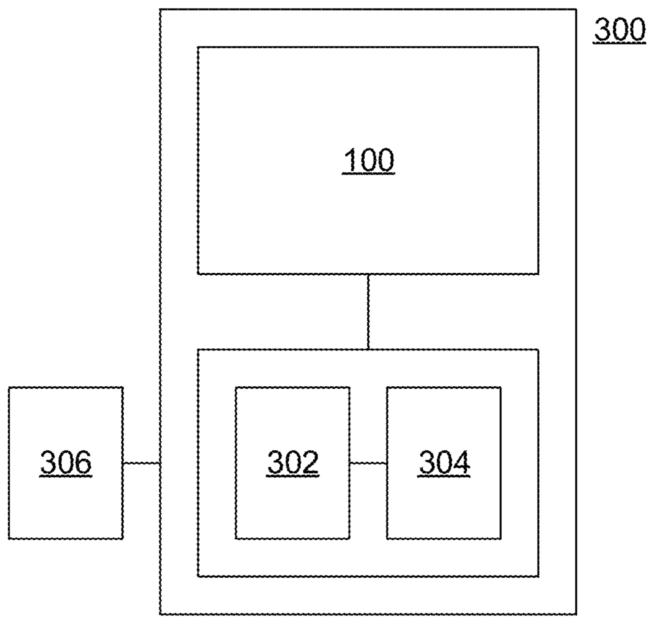
FIG. 10 shows an example of a computing device.

FIG. 1 shows an example of a multi-stage gesture for invoking functions or actions on a host computing device (see FIG. 10 for details thereof). Starting from the top of FIG. 1, a GUI environment is active on a display 100 and a user inputs a stroke 102, whose spatial relation to the GUI is indicated by the corresponding arrow representing stroke 102. The stroke 102 may be inputted by any of the types of input means mentioned in the Background; input devices for manually inputting streams of location points.

The GUI may implement or call logic to determine that the stroke 102 has completed a first phase (e.g., the stroke 102 has moved with requisite distance, direction, start and end locations, shape, etc.). At that time, if the stroke 102 ends (i.e., the user stops inputting the stroke 102), then a first function—Function-1—is invoked. However, if the stroke 102 continues without having ended then the logic may determine that the stroke 102 has completed a second phase, for example by dwelling within an area 104 for at least a predetermined time. In this case, if the user ends the stroke 102 then a second function is invoked—Function-2. Similarly, if the stroke 102 continues and it is determined that the stroke 102 has completed a third phase then a third function is invoked—Function-3. While tri-phase gestures are described herein, it will be appreciated that two-phase gestures are separately useful and all discussion of three phases is considered to be equally applicable to two-phase gestures. Any three-phase gesture described herein may inherently be any of several two-phase gestures. In addition, any technique described in relation to any stage or phase is applicable to any arbitrary gesture of two or more progressive phases or stages. That is to say, aspects of embodiments described herein can be used to build arbitrary progressive gestures of two or more stages using arbitrary gesture features for stage delineation.

Depending on implementation, only the function of the last completed phase is invoked, or each function of each completed phase may be invoked, or a combination may be used. It is also possible for functions to be partly executed when a phase is partly completed. It is also possible for functions to be invoked in anticipation of a phase and then rolled back or reversed when the phase does not occur. The functions may be any arbitrary actions invocable by the GUI. In embodiments discussed further below, the functions may be for closing, terminating, and restarting an application. Note that as used herein, "closing" will usually refer to a "soft" close of an application, as discussed below with reference to FIG. 4.

Figure 2:
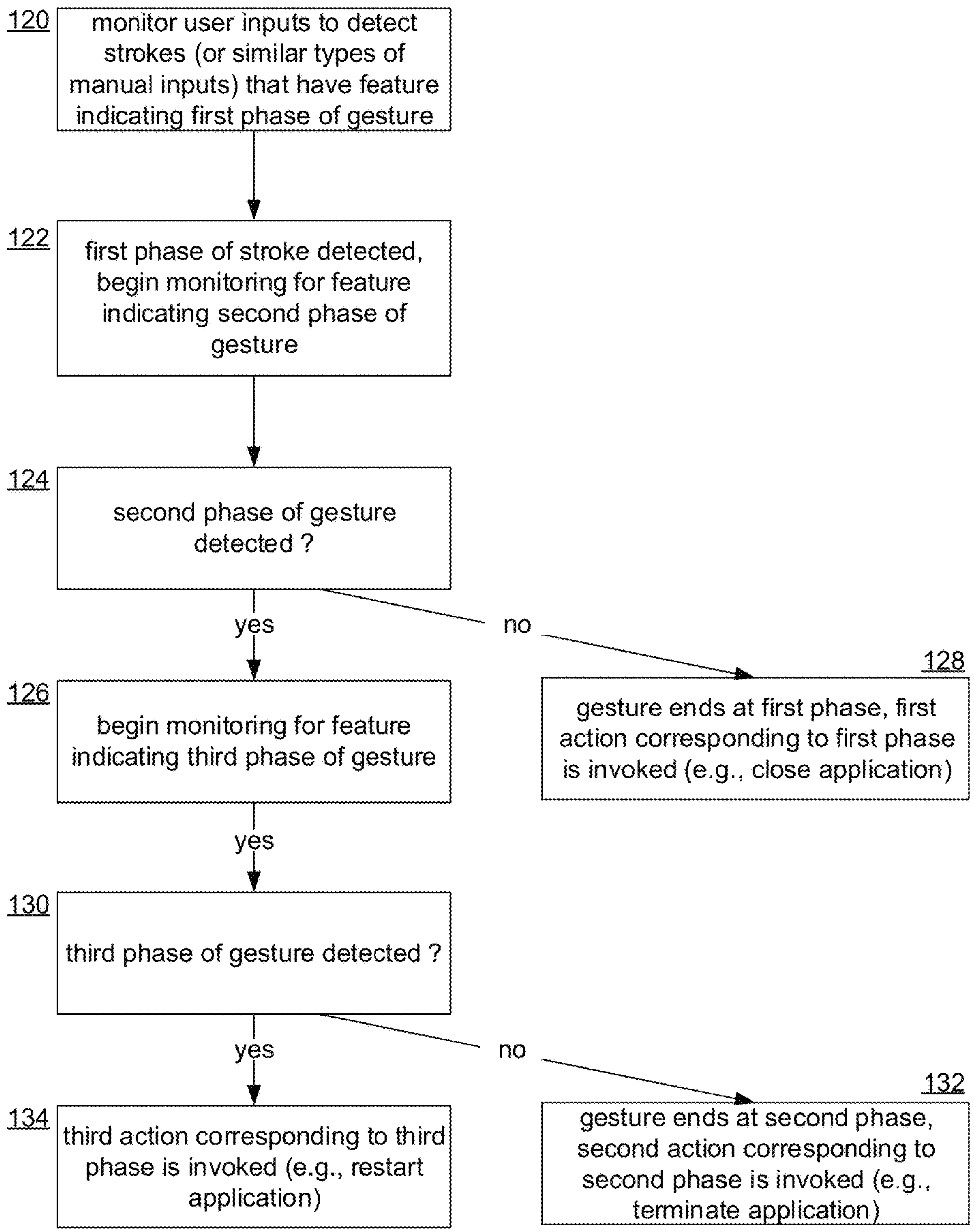
FIG. 2 shows a process for implementing a tri-phase gesture.

FIG. 2 shows a process for implementing a tri-phase gesture. The process uses features of strokes (patterns) to recognize when various gesture phases have been completed (i.e., a gesture phase or sub-gesture is recognized). As noted above, a feature might be a requisite distance, a specific direction, a relation with a predefined location or region, an inflection, a shape or type of motion, a speed, or any other property or combination of properties of stroke-type input. In short, certain predefined features are used to recognize gesture phases or sub-gestures.

At step 120 a GUI component monitors user inputs to detect strokes that have a first feature, thereby recognizing that a first phase of the gesture has been completed. This enables step 122, which begins monitoring for a feature indicating completion of a second phase of the gesture. At step 124, if the second phase of the gesture is not detected then at step 128 the gesture ends and, due to the prior completion of the first phase, the first action or function corresponding to the first phase is invoked. However, if the second phase of the gesture is detected, for example by determining that the stroke has yet another specific feature, then step 126 begins monitoring for a feature indicating a third phase of the gesture. Assuming that the same stroke continues, if the stroke ends before a feature indicating the third phase is detected, then at step 132 the second phase of the gesture is deemed to have been inputted and a second action that corresponds to the second phase is invoked. However, if the feature for the third phase is detected then at step 134 the third phase is recognized and a corresponding third action is invoked. As will become apparent below, the timing for invoking an action associated with a gesture stage can vary. In some embodiments or stages an action may be triggered by an implicit gesture feature (e.g., omission of a feature by the user), whereas in others an action may be triggered explicitly. For example a completion might be signaled by ending a stroke before an output occurs.

As can be seen from the discussion of FIG. 2, a gesture may be implemented that has three successive phases or stages. Each phase may function as a different independent user instruction or selection. Although the feature for the first phase may occur, the first phase is overridden by the second phase if the feature of the second phase is detected. Similarly, the second phase may be overridden or ignored if a feature indicating the third phase is detected. Which phase is triggered may depend on when the input stroke ends. If the input stroke ends after the first feature but before the second feature, then the first phase is the only function-activating gesture. If the input stroke ends after the second feature but before the third feature, then the second phase is the only function-activating gesture. If the input stroke ends after the third feature, then the third phase is the only function-activating gesture.

In another embodiment, even if a phase is overridden or superseded by recognition of a later phase, the function for that overridden phase, or even another function, may be invoked. For example, if the first feature is detected and then the second feature is detected, then both the first and second actions might be invoked. It is also possible to begin performing some action in anticipation of a next possible phase when a prior phase is recognized. For example, when the first phase is recognized a task may be executed to prepare for the possibility that the second phase will be recognized and that the second function will be invoked.

Figure 3:
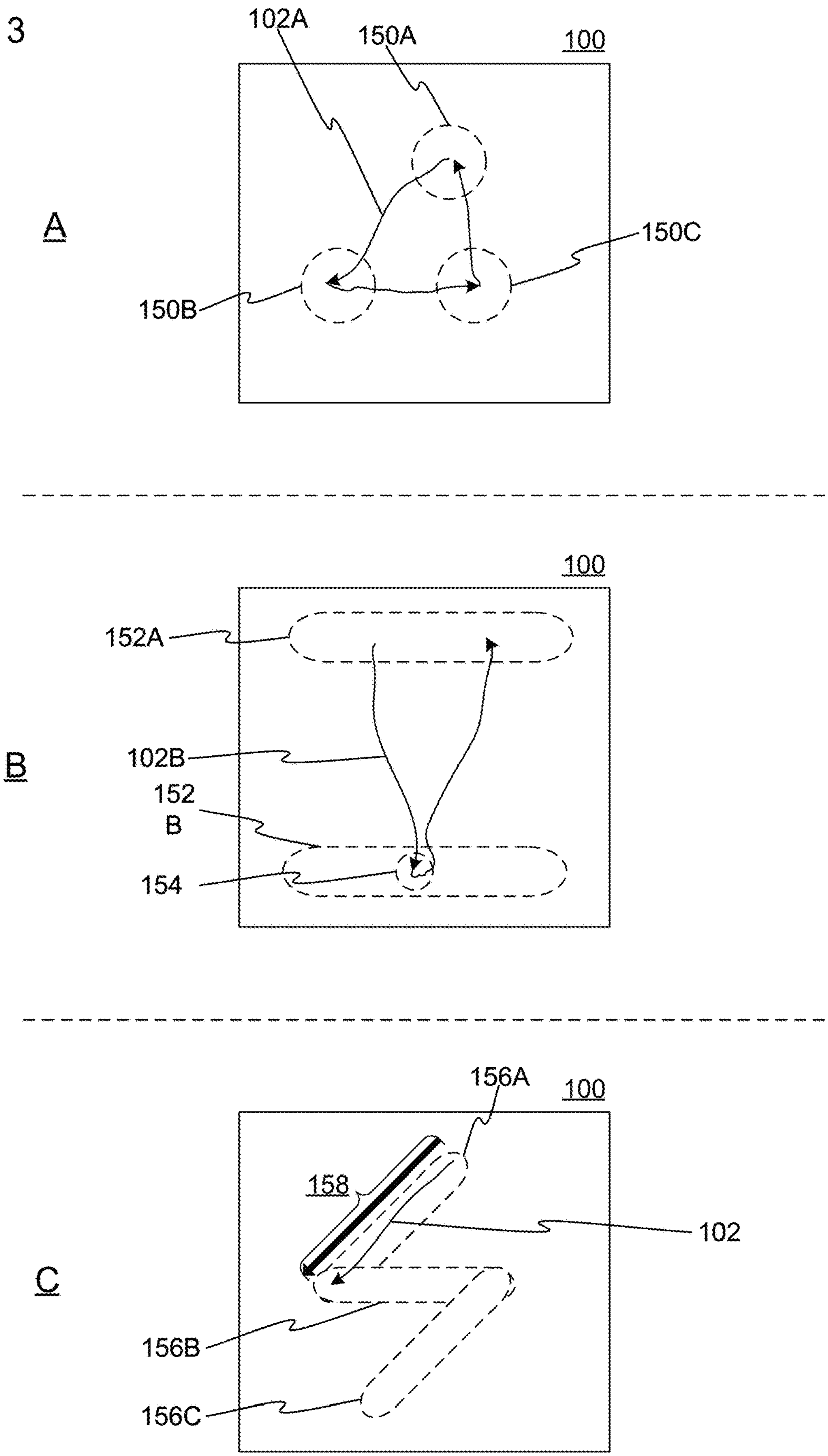
FIG. 3 shows examples of types of features or patterns that can be used to differentiate gesture phases.

FIG. 3 shows examples of types of features or patterns that can be used to differentiate gesture phases. Example A has three regions 150A, 150B, 150C, which might be fixed in location relative to the display 100 or may be located dynamically. Starting at the first region 150A and moving into the second region 150B serves as the first feature, moving from the second region 150B to the third region 150C serves as the second feature, and moving from the third region 150C to the first region 150A serves as the third feature. Example B has two regions 152A, 152B. Starting in region 152A and moving into region 152B is a first feature, dwelling or pausing the stroke within region 152B (or a region defined by the stroke, such as region 154) is the second feature, and moving to the first region 152A is the third feature. In example C there are predefined directions 156A, 156B, 156C with predefined distances such as distance 158. The features are respective lengths of movement in respective directions (e.g., tracing a "Z" shape). In practice, distances and directions will have tolerances to allow for minor variation and imprecise input movement. It will be appreciated that these are illustrative and non-limiting examples; any combination of feature types and feature properties may be used.

Figure 4:
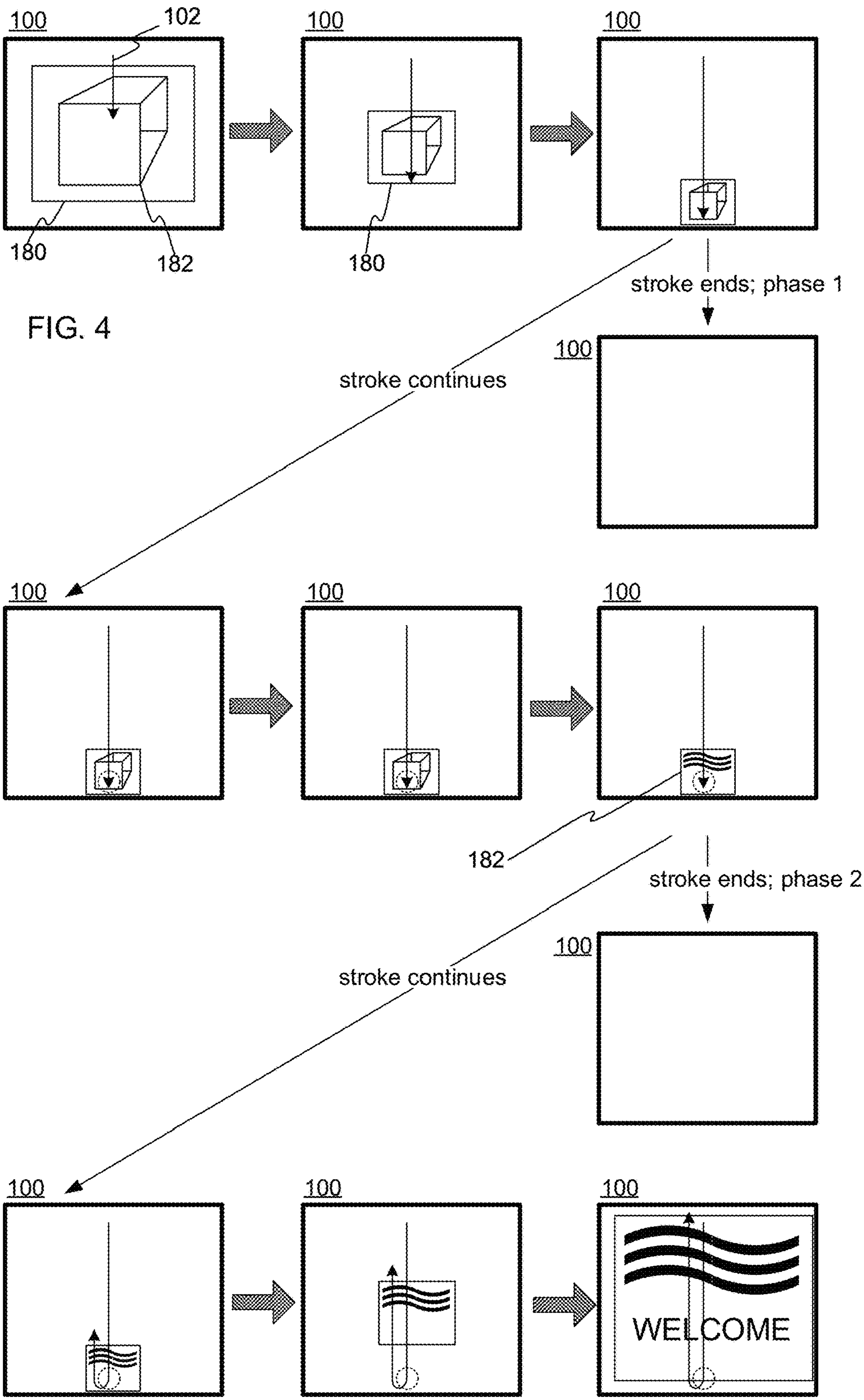
FIG. 4 shows a detailed example of how user interface (UI) feedback can be displayed to help a user appreciate a graphical user interface's recognition of various gesture stages and the corresponding invocation of functions.

FIG. 4 shows a detailed example of how user interface (UI) feedback can be displayed to help a user appreciate the GUI's recognition of various gesture stages and the corresponding invocation of functions. The example in FIG. 4 will be described as triggering functions for various types of application "close" functions.

Initially, on display 100 an application window 180 is displayed for a computer-assisted drafting (CAD) application. The window 180 includes a shape 182 being edited by a user. The stroke features for the multi-phase gesture will be those discussed in example B of FIG. 3. The use of visual feedback such as animations may involve multiple features for each gesture phase. Initially, at the upper left corner of FIG. 4, the stroke 102 begins. The stroke starting and moving out of region 152A (not shown in FIG. 4) triggers a visual effect of shrinking the application window 180. The continuation of the stroke 102 drags the shrunken application window 180 downward. If the stroke 102 moves into region 152B then the first feature is detected and at least the first phase and possibly a later phase will occur, depending on what happens next. If the stroke ends before the second phase's feature is detected, then a soft close occurs; the application window 180 is undisplayed or backgrounded and possibly execution of the CAD application is suspended.

Proceeding from left to right in the middle of FIG. 4, if the stroke 102 continues after phase one, then the feature of phase two is monitored for. If that feature is detected, for example dwelling for a predefined time such as three seconds, then another visual effect is performed: the miniaturized application window 180 is replaced with an icon 182 (or a minimized splash screen) symbolically representing the CAD application. Note that a splash screen may or may not be created by the application itself. For instance, when an application is not running a representation of the application may be created on the application's behalf. In addition, application representations may be a live window of the application (perhaps at the scale of tiles and icons), image data captured from a window of the application, etc. Referring again to FIG. 4, if the stroke ends then a second function is invoked. In this example, that involves a "hard" close of the application, meaning execution of the application terminates and executing code or a process of the application may be removed from memory and the icon 182 is undisplayed.

If the stroke continues, for example upward, then the continuation of the stroke before recognition of the third phase may cause another visual effect, for example enlarging the icon 182. Completion of the third phase, such as by ending the stroke in the region 152A, may result in yet another effect, such as showing a splash screen or other representation of the application. In addition, not only is the application closed but the application is started. Note that because the function of the second phase includes a function of the third phase (termination), the second function can be performed when the second phase completes; if the third phase completes then the application is simply started.

FIG. 5 shows attributes of example application management functions. The close operation 200 may be a "soft" close, meaning that the targeted application is partially or wholly removed from the display. In addition, the target application may be removed from user interface elements that track and possibly manipulate active applications. For example, if there is a task switcher in the form of a stack of application icons, then a target application's icon might be removed from the stack when the close operation 200 is invoked. However, the close operation 200 may allow the target application's process to remain in memory, either running in the background or suspended.

The terminate operation 202 may also remove the target application from the screen and remove representation of the target application from one or more user interface tools for selecting among active applications. In addition, the target application is killed and is no longer executing on the host computing device.

The restart operation 204 may result in the target application being displayed on the display, available in a task switcher, and running. The restart operation may also involve terminating a prior execution of the target application. In one embodiment, the target application is terminated by an invocation of the terminate operation 202 at the second phase of the gesture, and so the restart operation 204 may only start the target application. In another embodiment, the restart operation 204 both terminates the application and starts the application.

Figure 6:
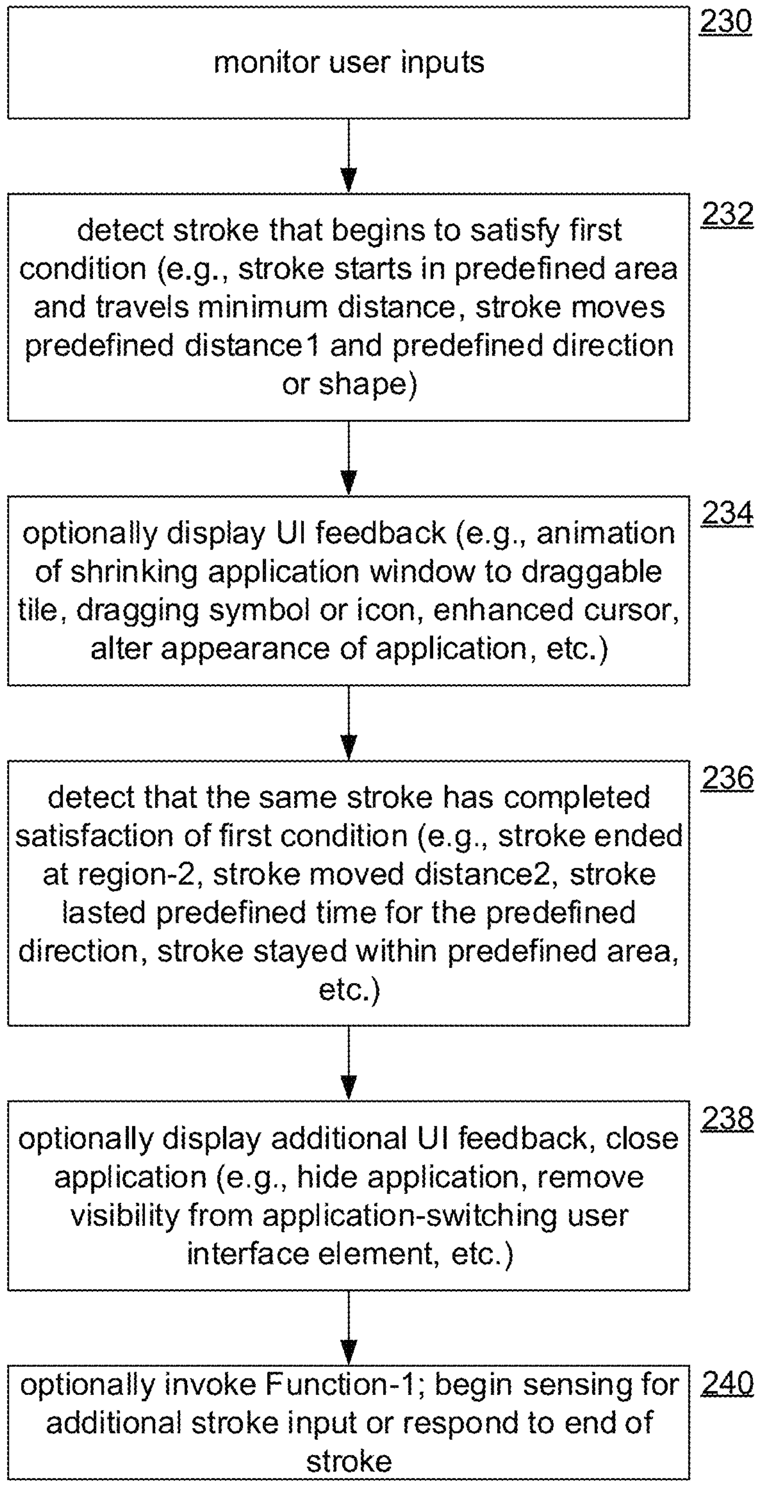
FIG. 6 shows a detailed process for detecting a first stage of a multi-stage gesture.

FIG. 6 shows a detailed process for detecting a first stage of a multi-stage gesture. Initially, a GUI environment such as a user shell monitors user input at step 230. At step 232, when a stroke is detected that begins to satisfy a first condition then UI feedback may be optionally displayed at step 234. At step 236 completion of the first condition by the same stroke is detected, additional UI feedback may be displayed at step 238, and at step 240 the function corresponding to the first phase of the gesture may be invoked. In addition, the monitoring begins to sense for additional input for the next phases of the gesture (if the stroke has not ended). Optionally, invocation of the first phase's function may be conditioned upon whether the second phase is completed.

Figure 7:
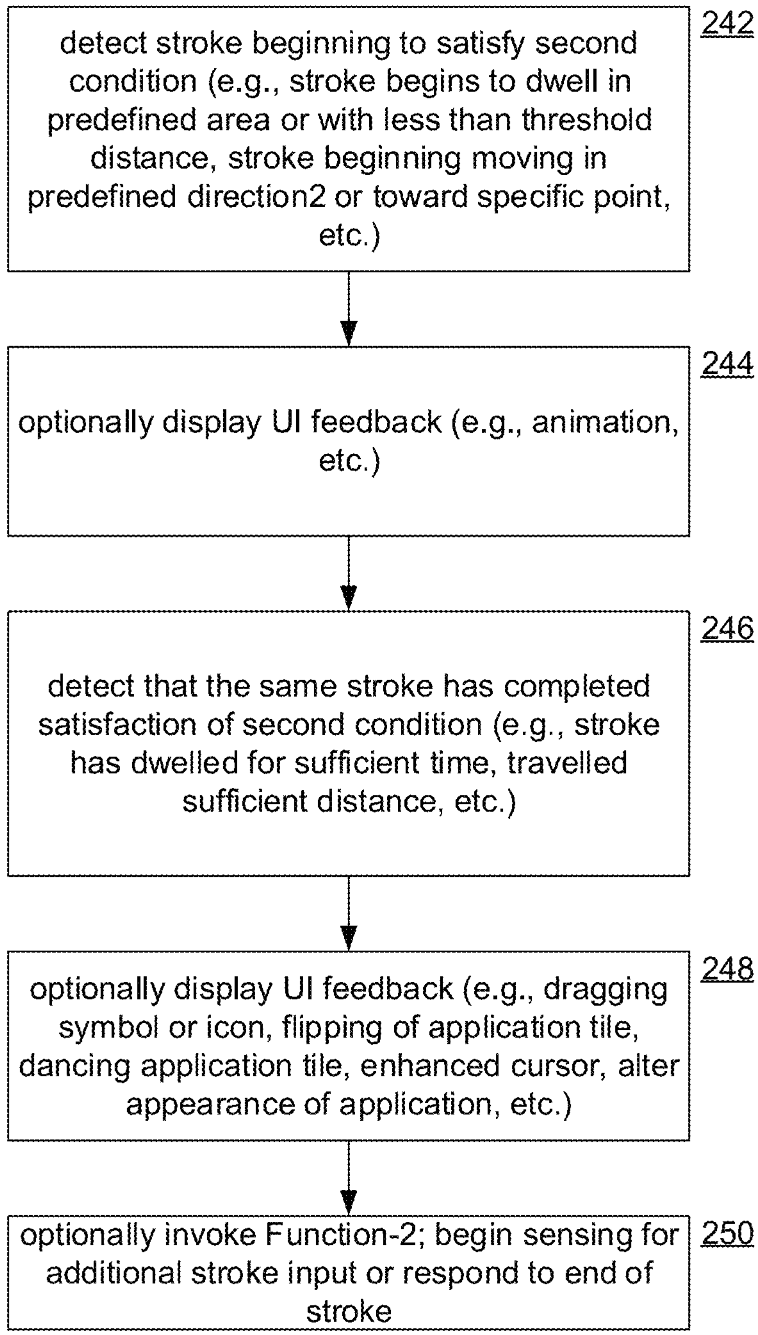
FIG. 7 shows a detailed process for detecting a second stage of a multi-stage gesture.

FIG. 7 shows a detailed process for detecting a second stage of a multi-stage gesture. At step 242 the monitoring detects the beginning of satisfaction of a second condition, and optionally in response the UI may display related feedback at step 244. At step 246 when it is detected that the second condition has been completed, then again optional UI feedback may be displayed at step 248. In addition, at step 250, the second function may be invoked, and if the stroke continues then the monitoring may continue.

Figure 8:
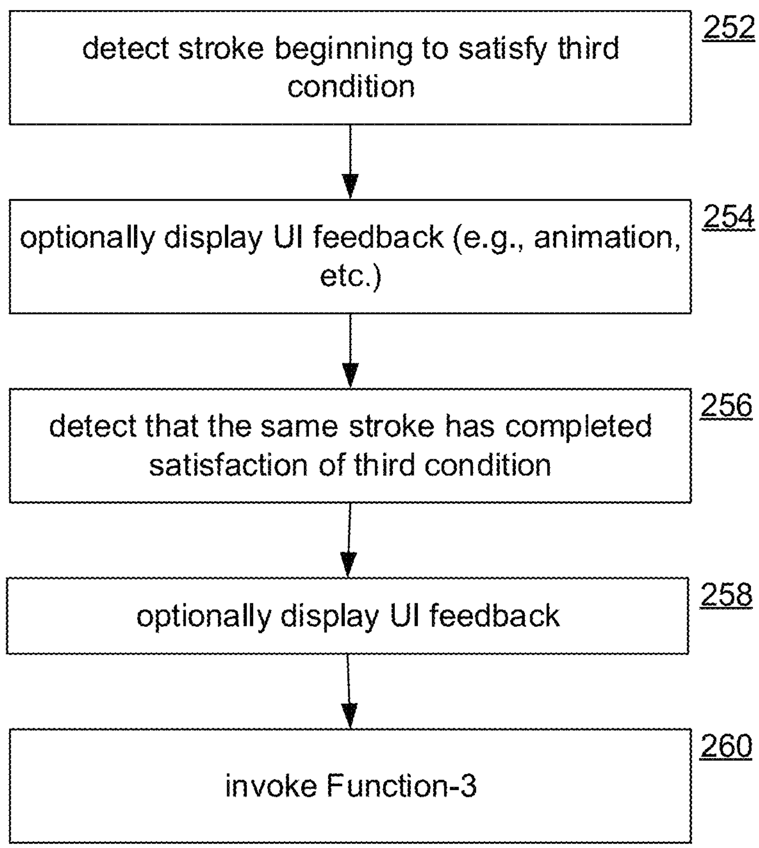
FIG. 8 shows a detailed process for detecting a third stage of a multi-stage gesture.

FIG. 8 shows a detailed process for detecting a third stage of a multi-stage gesture. At step 252 it is determined that a third condition is potentially being satisfied by the stroke and UI feedback may be displayed at step 254. At step 256 it is detected that that the stroke has fully satisfied the third condition. Consequently, step 258 may provide visual feedback on the display, and a third function is invoked at step 260.

It may be noted that at various steps the stroke may negate or fail to satisfy one of the conditions. For example, the first condition begins to be satisfied and some display activity results, and then the first condition is not satisfied (e.g., the stroke ends prematurely). In this case, not only does the gesture end without completing the first phase (and without invocation of the first function), but UI feedback may be displayed to indicate termination or incompletion. For example, optional UI feedback may be displayed or a prior UI feedback may be displayed in reverse. If the first condition is fully satisfied and the second condition is only partially satisfied when the stroke ends, then the first function may be invoked, the second function is not invoked, and an animation or the like may be displayed. If the second condition is fully satisfied and the third condition is partly satisfied, then only the second stage is completed, the third function is not invoked, and again feedback may be shown.

As noted above, the functions may be cumulative in effect. That is, if the first phase of the gesture is recognized the first function is invoked, and if the second phase is recognized the second function is invoked, and if the third phase is recognized then the third function is invoked. In addition, other forms of visual feedback may be used. For example, a simple three-part animation may be played in accordance with phase completion. In another embodiment, sound feedback is provided in addition to or instead of visual feedback.

Figure 9:
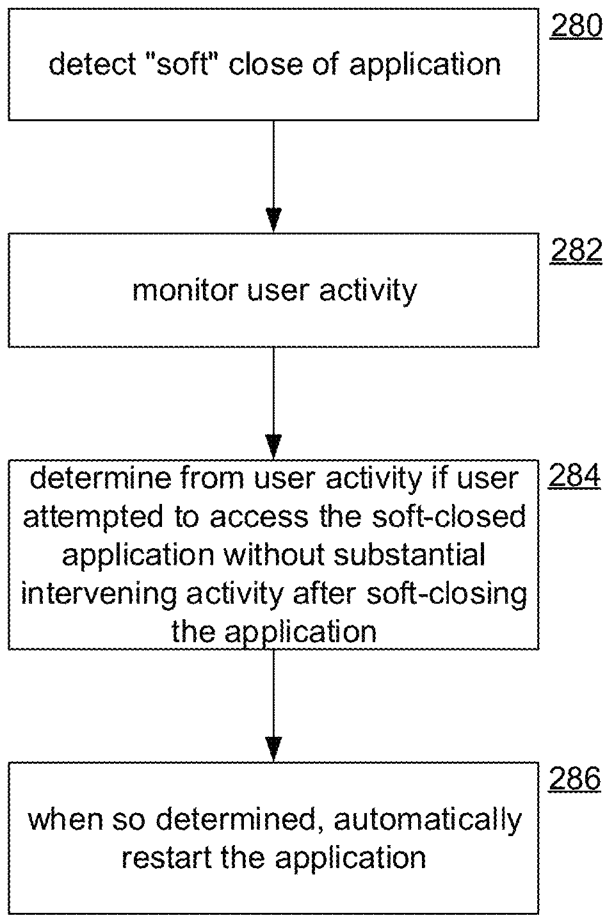
FIG. 9 shows a process for a smart-restart embodiment.

FIG. 9 shows a process for a smart-restart embodiment. The objective of the smart-restart process is to automatically interpret certain user activity as indicating an intent to actually restart an application although a soft close may have been invoked. Initially, at step 280, a soft close of an application is detected. This may use a multi-phase gesture as discussed above, or any other form of user input or command. For example, a keyboard shortcut or button press may cause the target application to hide, minimize, or suspend and undisplay. After this is detected at step 280, the process begins to monitor for additional user activity at step 282. Any of numerous known techniques for monitoring user activity may be used, such as intercepting windowing events or signals issued by a window manager. At step 284 those interactions are examined to determine if the user has attempted to access the soft-closed application without substantial intervening activity after the soft-closing. Put another way, user activity is analyzed to determine if the user has closed the application and then substantially proceeded to open the same application. At step 286, when this is determined, then the application is automatically terminated and a new execution of the application is initiated.

There may be a list of predefined user actions that are considered to indicate that a restart is not desired by the user. For example, there may be stored indicia of actions such as interaction with an application other than the target application, rearranging applications, switching-to or launching other applications, and so forth. If one of the actions in the list are detected, then the smart-restart process ends and the application remains soft-closed. In addition or instead, there may be a list of activities or actions that are to be ignored; such actions do not disrupt the step of terminating and starting the application if it is determined that the user is opening the soft-closed target application.

It is expected that the embodiments described herein will be suitable for use in environments where other gestures are active and usable for arbitrary known or new actions such as moving windows, rearranging icons, etc. This allows sequences of actions invoked by gestures, such as restarting an application, rearranging the same application, placing the application in a switch list, and so on. Gestures can be used to perform actions that transform the state of the application without forcing abandonment of other gestures, in a sense abstracting state of the application.

The use in this description of "optional" regarding various steps and embodiment should not be interpreted as implying that other steps or features are required. In addition, when implemented, the steps discussed herein may vary in order from the orderings described above.

FIG. 10 shows an example of a computing device 300. The computing device 300 may have a display 100, as well as storage 302 and a processor 304. These elements may cooperate in ways well understood in the art of computing. In addition, input devices 306 may be in communication with the computing device 300. The display 100 may be a touch-sensitive display that also functions as an input device. The computing device 300 may have any form factor or be used in any type of encompassing device. For example, touch-sensitive control panels are often used to control appliances, robots, and other machines. Of course the computing device 300 may be in the form of a handheld device such as a smartphone, a tablet computer, a gaming device, a server, or others.

Embodiments and features discussed above can be realized in the form of information stored in volatile or non-volatile computer or device readable media (which does not include signals or energy per se). This is deemed to include at least media such as optical storage (e.g., compact-disk read-only memory (CD-ROM)), magnetic media, flash read-only memory (ROM), or any means of storing digital information in a physical device or media. The stored information can be in the form of machine executable instructions (e.g., compiled executable binary code), source code, bytecode, or any other information that can be used to enable or configure computing devices to perform the various embodiments discussed above. This is also deemed to include at least volatile memory (but not signals per se) such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device discussed above.

The invention claimed is:

1. A method of implementing a multi-stage gesture on a computing device comprising a processor, a display, and an input device, the method comprising:

receiving sequentially inputted strokes, each stroke comprising a discrete contiguous two-dimensional path inputted by a user by a respectively corresponding new contact with the display and ended by a respectively corresponding termination of the contact, wherein each stroke respectively corresponds to a single first-stage gesture or a single second-stage gesture;

automatically identifying first-stage gestures by determining that corresponding first of the strokes have each individually satisfied a first condition followed immediately by having ceased being inputted by the user ending a respectively corresponding contact with the display, the first condition comprising a first dwell time, wherein a first visual effect is performed based on the first dwell time being satisfied;

each time a first-stage gesture is identified as part of the discrete contiguous two-dimensional path, responding by automatically triggering a first action on the computing device;

automatically identifying second-stage gestures by determining that second of the strokes have each individually satisfied a second condition followed immediately by having ceased to be inputted by the user by ending a respectively corresponding contact with the display, the second condition comprising, having satisfied the first condition, and immediately thereafter, having satisfied a second dwell time, wherein a second visual effect is performed based on the second dwell time being satisfied; and each time a second-stage gesture is identified as part of the discrete contiguous two-dimensional path, responding by automatically triggering a second action on the computing device.

2. A method according to claim 1, wherein the each stroke further comprises features including a plurality of predefined directional features, wherein each directional feature of the plurality of directional features indicates a separate function.

3. A method according to claim 1, wherein predefined features of strokes are used to recognize the first-stage gestures and the second-stage gestures of the discrete contiguous two-dimensional path.

4. A method according to claim 1, wherein the first-stage gestures select respective first objects, and based thereon the first action is performed on the first objects.

5. A method according to claim 4, wherein the second-stage gestures select respective second objects, and based thereon the first and second actions are performed on the second objects.

6. A method according to claim 1, wherein the each stroke further comprises features including a relation with a predefined location or region.

7. A method according to claim 1, wherein the first action and the second action are performed on a same object.

8. A method according to claim 1, the second condition further comprising:

immediately after satisfying the first condition, continuing to be inputted but without substantial movement and for at least a given amount of time.

9. A computing device comprising:

processing hardware;

a display configured to sense touches; and storage hardware storing information configured to cause the processing hardware to perform a process, the process comprising:

displaying an application comprised of user-selectable graphic objects on the display, each object representing a respective object;

receiving sequentially inputted first and second stroke inputs from the display, geometry of each stroke input consisting of a respective continuous two-dimensional input path corresponding to a continuous two-dimensional touch sensed by the display that starts with a respective new contact with the display and ends with termination of the contact, wherein intersection of a location of the new contact of the first stroke input with a first of the graphic objects selects the first of the graphic objects representing a first corresponding object, and wherein intersection of a location of the new contact of the second stroke input with a second of the graphic objects selects the second of the graphic objects representing a second corresponding object;

identifying features of the first and second stroke inputs;

making a first determination that a first feature of the first stroke input matches a first condition associated with a first-stage gesture as part of a continuous two-dimensional input path;

based on the first determination and the selection of the first object by the first stroke input, invoking a first operation on the first object, wherein the first stroke input does not invoke a second operation based on the first stroke input ending before being able to satisfy a second condition, wherein the second operation is associated with the second condition, wherein the first condition comprises a first dwell time, wherein a first visual effect is performed based on the first dwell time being satisfied, and wherein the second condition comprises a second dwell time, wherein a second visual effect is performed based on the second dwell time being satisfied;

making a second determination that a first feature of the second stroke input matches the first condition, and based on (i) the second determination and (ii) the selection of the second object by the second stroke input, invoking the first operation on the second object; and after the second determination, making a third determination that a second feature of the second stroke input matches the second condition, and based on (i) the third determination and (ii) the selection of the second object by the second stroke input, invoking the second operation on the second object, wherein the second feature of the second stroke input corresponds to a portion of the second stroke input that came after a portion of the second stroke input that corresponds to the first feature of the second stroke input.

10. A computing device according to claim 9, the process further comprising displaying a user interface on the display, the user interface configured to:

display a first graphic feedback responsive to the first determination, display the first graphic feedback responsive to the second determination, and display a second graphic feedback responsive to the third determination.

11. A computing device according to claim 9, wherein the first stroke input drags a first graphic object representing the first object, and wherein the second stroke input drags a second graphic object representing the second object.

12. A computing device according to claim 11, wherein a first graphic effect is applied to the first graphic object based on the first determination, wherein the first graphic effect is applied to the second graphic object based on the second determination, and wherein a second graphic effect is applied to the second graphic object based on the second determination.

13. A computing device according to claim 9, wherein the first condition is satisfied by a first segment of the input path of the second stroke input, and wherein the second condition is satisfied by a second segment of the input path of the second stroke input.

14. A computing device according to claim 13, wherein the first segment starts with the start of the second stroke input, the second segment ends at a beginning of the second stroke input, and the second stroke input ends at the end of the input path of the second stroke input.

15. Computer readable storage hardware storing information configured to enable a computing device to perform a process, the process comprising:

receiving sequential input strokes inputted into an area configured to enable the input strokes to select objects displayed by an application, wherein each input stroke comprises a discrete contiguous two-dimensional path that begins with an initial new contact that selects a corresponding object thereunder and ends with an end of the corresponding contact, wherein each input stroke corresponds to only a single invocation of a first operation or second operation; and applying a condition chain to each input stroke that selects a respective object, the condition chain comprising a first condition followed by a second condition, the first condition associated with the first operation and comprising a first dwell time, wherein a first visual effect is performed based on the first dwell time being satisfied, the second condition associated with the second operation and comprising a second dwell time, wherein a second visual effect is performed based on the second dwell time being satisfied, wherein the second condition can only be satisfied by input strokes that also satisfy the first condition, wherein each time the first condition is satisfied by a corresponding input stroke that does not satisfy the second condition the first operation is performed on whichever object was selected by the initial new contact of the corresponding input stroke, wherein each time the second condition is satisfied by a corresponding input stroke the second operation is performed on whichever object was selected by the initial new contact of the corresponding input stroke, wherein the performances of the first and second operations on respective objects is based on selection of the objects by the initial new contact of the respective input strokes.

16. Computer readable storage hardware according to claim 15, wherein the first condition can only be satisfied by movement of an input stroke, and wherein the second condition can only be satisfied by additional movement of an input stroke.

17. Computer readable storage hardware according to claim 15, wherein the condition chain comprises a third condition that can only be satisfied by input strokes that also satisfy the first and second conditions, wherein the third condition is associated with a third operation, and wherein each time an input stroke satisfies the third condition the third operation is performed on whichever object was selected by the corresponding input stroke.

18. Computer readable storage hardware according to claim 15, wherein input strokes that satisfy the second condition invoke the second operation and not the first operation, the first operation not being invoked on the basis of satisfying the second condition.

19. Computer readable storage hardware according to claim 15, wherein input strokes that continue after satisfying the first condition but terminate before satisfying the second condition invoke only the first operation.

20. Computer readable storage hardware according to claim 19, wherein input strokes that continue after satisfying the first condition and terminate after satisfying the second condition invoke the second operation and do not invoke the first operation.

* * * * *